(12) United States Patent
Isaac

(10) Patent No.: US 7,244,363 B2
(45) Date of Patent: Jul. 17, 2007

(54) METHODS FOR TREATING HEAVY HALIDE BRINES WITH PERMANGANATES

(75) Inventor: D. Donald Isaac, Mandeville, LA (US)

(73) Assignee: Halliburton Energy Services, Inc., Duncan, OK (US)

( * ) Notice: Subject to any disclaimer, the term of this patent is extended or adjusted under 35 U.S.C. 154(b) by 84 days.

(21) Appl. No.: 10/864,060

(22) Filed: Jun. 9, 2004

(65) Prior Publication Data

US 2005/0274677 A1    Dec. 15, 2005

(51) Int. Cl.
*B01D 21/01* (2006.01)

(52) U.S. Cl. .................. 210/721; 166/267; 175/66; 210/722; 210/725; 210/912

(58) Field of Classification Search ............ 166/267; 175/66; 210/721
See application file for complete search history.

(56) References Cited

U.S. PATENT DOCUMENTS

| | | | | |
|---|---|---|---|---|
| 2,395,221 A | * | 2/1946 | Hampel et al. | 423/197 |
| 3,649,532 A | | 3/1972 | McLean | 210/48 |
| 3,737,037 A | | 6/1973 | Bone, III | 210/73 |
| 4,384,961 A | | 5/1983 | Abrams et al. | 210/756 |
| 4,451,377 A | * | 5/1984 | Luxemburg | 210/708 |
| 4,465,598 A | | 8/1984 | Darlington et al. | 210/721 |
| 4,548,720 A | | 10/1985 | Gilligan, III | 252/8.5 B |
| 4,594,170 A | | 6/1986 | Brown et al. | 252/8.55 R |
| 4,618,433 A | | 10/1986 | Allison, III | 252/8.514 |
| 4,634,533 A | | 1/1987 | Somerville et al. | 210/722 |
| 4,704,214 A | | 11/1987 | Russell et al. | 252/8.514 |
| 4,755,303 A | | 7/1988 | Sweat | 210/722 |
| 5,009,798 A | | 4/1991 | House et al. | 252/8.551 |
| 5,128,046 A | * | 7/1992 | Marble et al. | 210/705 |
| 6,143,698 A | | 11/2000 | Murphey et al. | 507/145 |
| 6,730,234 B2 | | 5/2004 | Symens et al. | 210/753 |

FOREIGN PATENT DOCUMENTS

GB    1337651    11/1973

OTHER PUBLICATIONS

Paper entitled "Methods Of Iron Removal From Domestic Water Supplies," By Sybron Chemicals Inc., pp. 1-7, date unavailable.

* cited by examiner

*Primary Examiner*—Peter A. Hruskoci
(74) *Attorney, Agent, or Firm*—Craig W. Roddy; Baker Botts

(57) ABSTRACT

The present invention relates to the use of permanganate in the removal of heavy metal contaminants from heavy halide brines. In some embodiments, the present invention discloses methods of treating heavy halide brines that comprise providing a heavy halide brine that comprises a heavy metal contaminant, wherein the heavy metal contaminant comprises water-soluble ions; adding permanganate to the heavy halide brine; allowing a water-insoluble compound to form; and mixing the heavy brine and the water insoluble compound. In other embodiments, the present invention discloses methods of removing heavy metal contaminants from heavy halide brines.

41 Claims, No Drawings

METHODS FOR TREATING HEAVY HALIDE BRINES WITH PERMANGANATES

BACKGROUND

The present invention relates to the treatment of heavy brines. More particularly, the present invention relates to the use of permanganates in the removal of heavy metal contaminants from heavy halide brines.

Brines are used commonly in subterranean operations during a variety of applications, including completion and workover operations. Generally, these brines are aqueous solutions of salts, such as calcium chloride, calcium bromide, zinc bromide, or mixtures thereof. During completion and workover operations, it may be desirable for the brines to be solids free. Brines that contain an undesirable level of solids may be problematic due, *inter alia*, to the undesirable introduction of solids into the near well bore region. During use, these brines may become contaminated with certain heavy metals (e.g., iron), which may render them unusable for these subterranean operations. For instance, these heavy metal contaminants may precipitate as the oxide or hydroxide thereof when the brine contacts the formation or mixes with formation water, thereby possibly causing formation damage. Iron contamination also may react adversely with polymers and cause a crosslink effect that may damage formations. Iron contamination also may stabilize brine/crude emulsions, which may have a detrimental impact on production. Furthermore, such contamination also may occur prior to use in storage tanks, transport vessels, and the like.

To remove such heavy metal contaminants from brines, the insoluble heavy metal contaminants may be separated from the brine by mechanical means, such as centrifugation, filtration, or decantation. To aid in the separation, liquid chemicals, such as bromate, hydrogen peroxide, or flocculants, may be added to the contaminated brine. These conventional reclamation treatments, however, may be problematic. For instance, substantial density may be lost as a result, and it may be necessary to perform multiple treatments in sequence. Another problem is that the byproducts from the conventional reclamation treatments typically may have a very low filterability, which may result in loss of brine volume and a substantial amount of residual sludge in the storage tanks that may need to be cleaned and transported to a waste disposal site, which can involve significant expenses.

SUMMARY

The present invention relates to the treatment of heavy brines. More particularly, the present invention relates to the use of permanganates in the removal of heavy metal contaminants from heavy halide brines.

In some embodiments, the present invention provides a method of treating a heavy halide brine. The method comprises providing a heavy halide brine that comprises a heavy metal contaminant, wherein the heavy metal contaminant comprises water-soluble ions; adding a permanganate to the heavy halide brine; allowing a water-insoluble compound to form; and mixing the heavy brine and the water insoluble compound.

In another embodiment, the present invention provides a method of reducing heavy metal contaminants in a heavy halide brine. The method comprises providing a heavy halide brine that comprises a heavy metal contaminant, wherein the heavy metal contaminant comprises water-soluble ions; combining a permanganate with the heavy halide brine; allowing a water insoluble compound to form; mixing the heavy halide brine and the water insoluble compound; and removing the water insoluble compound from the heavy halide brine.

The features and advantages of the present invention will be readily apparent to those skilled in the art upon a reading of the description of the detailed description, which follows.

DETAILED DESCRIPTION

The present invention relates to the treatment of heavy brines. More particularly, the present invention relates to the use of permanganates in the removal of heavy metal contaminants from heavy halide brines. As used herein, a halide brine is referred to as "heavy" where it has a density of greater than about 12 pounds per gallon ("ppg").

In some embodiments, the present invention provides methods for treating heavy halide brines that comprise: providing a heavy halide brine that comprises heavy metal contaminants, wherein the heavy metal contaminants comprise water-soluble ions; adding permanganate to the heavy halide brine; allowing a water insoluble compound to form; and mixing the heavy brine and the water insoluble compound. Among other things, the methods of the present invention may return the heavy halide brine to a desirable state without an undesirable reduction in the heavy halide brine's density.

The heavy halide brines suitable for use with the present invention generally comprise water and a salt. Generally, the water may be from any source provided that it does not adversely affect the other components of the heavy halide brines. Examples of suitable salts include, but are not limited to, calcium chloride, calcium bromide, zinc bromide, or mixtures thereof. These heavy halide brines typically are those brines that are suitable for use in completion and workover operations. Generally, the heavy halide brines used in the methods of the present invention should have a density of greater than about 12 ppg. In certain exemplary embodiments of the present invention, the heavy halide brines have a density in the range of from about 12 ppg to about 19 ppg. Furthermore, the heavy halide brines used in the methods of the present invention may be non-viscosified brines, or they may contain viscosifying agents, such as polysaccharides.

Generally, the heavy halide brines used in the methods of the present invention comprise heavy metal contaminants. The heavy metal contaminants may be those metals in the first transition series of the Periodic Table which have a stable oxidation state of +3 or higher. Generally, the term "stable oxidation state" refers to an oxidation state of the metal which may allow a solid oxide, hydrated oxide, or hydroxide thereof to be recovered from an aqueous solution of suitable pH. Such heavy halide brines may be contaminated with the heavy metal contaminants by a variety of means. For example, during the use, transportation, or storage of the heavy halide brines, heavy metals used in the metallic components with which the heavy halide brines come into contact may be solubilized so as to contaminate the brine with water-soluble ions of such heavy metals. Examples of heavy metals that the heavy halide brines may contact and solubilize include, but are not limited to, iron, chromium, cobalt, nickel, manganese, and mixtures thereof.

The amount of heavy metal contaminants present in the heavy halide brines may be dependent, *inter alia*, on the length of contact time with the heavy metal and various properties (e.g., pH and temperature) of the heavy halide brine. The presence of relatively small amounts of the heavy metal contaminants, e.g., greater than about 50 parts per million ("ppm") to about 75 ppm, may be problematic, such as in completion operations.

Examples of permanganates suitable for use in the present invention include potassium permanganate and sodium permanganate. In certain embodiments, the permanganates may be provided in solid form (e.g., powders). Potassium permanganate is commercially available in solid form from a variety of manufactures. In other embodiments, the permanganates may be provided in an aqueous fluid that comprises permanganate. An example of a suitable aqueous fluid that comprises permanganate that may be used in the methods of the present invention is "Liquox®" sodium permanganate, which is commercially available from Carus Chemical Company, Peru, Ill. Liquox® sodium permanganate comprises water and 40% sodium permanganate by weight.

The amount of the permanganate that should be added to the heavy halide brine may vary based on a variety of factors, such as the amount and type of heavy metal contaminants present in the heavy halide brine. The amount and type of the heavy metal contaminants may be determined, inter alia, by analyzing a sample of the heavy halide brine prior to treatment. Generally, the permanganate should be added to the heavy halide brine in an amount sufficient to oxidize the water-soluble ions of the heavy metal contaminants that are present in the heavy halide brine such that the remaining level of unoxidized water-soluble ions of the heavy metal contaminants may permit the heavy halide brine to be used in completion operations. In certain exemplary embodiments of the present invention, the permanganate should be added to the heavy halide brine in a heavy metal contaminant-to-permanganate weight ratio in the range of from about 5:1 to about 1:1. One of ordinary skill in the art with the benefit of this disclosure will be able to determine the appropriate amount of permanganate to add for a particular application.

According to the methods of the present invention, after the addition of the permanganate to the heavy halide brine, the heavy halide brine and permanganate may combined in a suitable manner. In some embodiments, the permanganate may be combined with the heavy halide brine by mixing. In certain exemplary embodiments, the permanganate should be added to the heavy halide brine while mixing. Where the permanganate is in a solid form, it may need to be mixed with a high shear device, such as a shear pump or a colloidal mixing pump, in order to solubilize the solid permanganate into the heavy halide brine. Generally, the heavy halide brine and permanganate may be mixed for a period sufficient to ensure hydration and dispersion of the permanganate within the heavy halide brine. When the permanganate is first added to the heavy halide brine, it imparts a purple tint to the heavy halide brine, but after a sufficient period of mixing, the heavy halide brine may have a burnt orange tint. The duration of the mixing period may depend, inter alia, on the amount of shear that may be applied to the heavy halide brine. For example, the lower shear that can be applied to the heavy halide brine, the longer mixing period may be needed. In certain exemplary embodiments, a mixing period of up to about 6 hours may be needed.

The permanganate added to the heavy halide brine should oxidize the water-soluble ions of the heavy metal contaminants that are present in heavy halide brine to a higher oxidation state so as to form water insoluble compounds. For example, the permanganate may oxidize the water-soluble ions of the heavy metal contaminants to a stable oxidation state so as to form water insoluble compounds. Generally, the water insoluble compounds formed from the oxidation of the water-soluble ions of the heavy metal contaminants may be oxides, hydrated oxides, and/or hydroxides of the heavy metal contaminants.

According to the methods of the present invention, after mixing of the permanganates with the heavy halide brine, a first static holding period is necessary to allow for the necessary oxidation reactions to occur and for separation of the water insoluble compounds from the heavy halide brine. The duration of the first static holding period may be determined by a variety of ways, for example, by observing a sample of the heavy halide brine that was taken after the appropriate mixing period. When the material within the sample separates into layers, the oxidation of the water-soluble ions of the heavy metal contaminants should be complete. The surface and bottom layers of the sample generally may comprise the water insoluble compounds with a clear middle layer comprising the heavy halide brine. It should be understood that the longer the first static holding period, the better the separation between the heavy halide brine and the water insoluble compounds. In certain exemplary embodiments of the present invention, the first static holding period may be in the range of from about 48 hours to about 96 hours. It is within the ability of one of ordinary skill in the art to determine the appropriate first static holding period based, inter alia, on the type and amount of heavy metal contaminants present in the heavy halide brine.

According to the methods of the present invention, after the first static holding period, the heavy halide brine and water insoluble compounds should be mixed to evenly distribute the water insoluble compounds within the heavy halide brine. Among other things, mixing the heavy halide brine after the first static holding period may allow for more effective removal of the water insoluble compounds from the heavy halide brine. For example, the dispersion of the water insoluble compounds may allow for filtration of the entire volume of fluid so the loss of fluid trapped between the sediment layers may be reduced. Furthermore, waste disposal costs may be reduced, inter alia, due to a reduction in the amounts of the water insoluble compounds remaining in the holding tanks after subsequent filtration.

The water insoluble compounds formed from the oxidation of the water-soluble ions of the heavy metal contaminants may be removed from the heavy halide brine by any suitable method. For example, the water insoluble compounds may be removed from the heavy halide brine by mechanical means, such as filtration, centrifugation, decantation, or the like. While it should be understood that the water insoluble compounds may be removed from the heavy halide brine at any point after its formation, in certain embodiments, the water insoluble compounds may be removed from the heavy halide completion after the heavy halide brine and water insoluble compounds have been mixed.

After removal of the water insoluble compounds the heavy halide brine should contain heavy metal contaminants in an amount such that the heavy halide brine may be used in completion operations. In an exemplary embodiment, the heavy halide brine, after removal of the water insoluble compounds, may have a heavy metal contaminant content of less than about 75 ppm.

Optionally, additives such as flocculants and basic materials may be used in the methods of the present invention as deemed appropriate by one skilled in the art. For example, in certain embodiments of the present invention, a basic material may be added to the heavy halide brine. While generally not necessary to effect formation and precipitation of the water insoluble compounds, a basic material may be added, as needed, to raise the pH or buffered alkalinity of the heavy halide brine to a point necessary for the water insoluble compounds to form. Examples of suitable basic materials include, but are not limited to, alkali metal hydroxides or oxides, such as sodium hydroxide; and alkaline earth metal hydroxides or oxides, such as anhydrous calcium hydroxide, calcium hydroxide, calcium oxide, and magnesium oxide. While it should be understood that the basic material may be added to the heavy halide brine at any point during the methods of the present, in certain embodiments, the basic material may be added to the heavy halide brine simultaneously with the permanganate. Generally, the amount of the basic material that may be added may depend upon the pH necessary to effect formation and precipitation of the water insoluble compounds, which in turn may depend, inter alia, upon the type and amount of heavy metal contaminants present in the heavy halide brine. In certain embodiments, the basic material may be added to the heavy halide brine in an amount sufficient to go into solution while leaving substantially no basic material unhydrated.

Further, flocculants optionally may be used in the methods of the present invention. An example of a suitable flocculant is a "Cyanamer®" flocculant, which is commercially available from Cytech, Industries, West Paterson, N.J. For example, flocculants may be added to the heavy halide brine after the first static holding period so as to form flocs of the water insoluble compounds for removal. In certain embodiments, there may be a second static holding period of from about 12 hours to about 72 hours after addition of the flocculants in order to allow the flocculants to coalesce the water insoluble compounds into flocks.

In some embodiments, the present invention provides a method of treating a heavy halide brine. The method comprises providing a heavy halide brine that comprises a heavy metal contaminant, wherein the heavy metal contaminant comprises water-soluble ions; adding a permanganate to the heavy halide brine; allowing a water-insoluble compound to form; and mixing the heavy brine and the water insoluble compound.

In another embodiment, the present invention provides a method of reducing heavy metal contaminants in a heavy halide brine. The method comprises providing a heavy halide brine that comprises a heavy metal contaminant, wherein the heavy metal contaminant comprises water-soluble ions; combining a permanganate with the heavy halide brine; allowing a water-insoluble compound to form; mixing the heavy halide brine and the water insoluble compound; and removing the water insoluble compound from the heavy halide brine.

To facilitate a better understanding of the present invention, the following examples of preferred embodiments are given. In no way should the following examples be read to limit, or to define, the scope of the invention.

EXAMPLES

In the following example, several sample brines were treated with permanganate. A variety of sample brines were treated, including, calcium bromide brines and zinc bromide brines. Before treatment, the initial density (ppg), initial iron content (mg/L), and initial pH of the brine samples were determined using known techniques. The following procedure was used for treatment of the sample brines, Sample Brine Nos. 1-7, with the permanganate.

First, a predetermined amount of permanganate was added to 1 liter of each of the sample brines under high shear. The permanganate used was either potassium permanganate ("KMnO$_4$") or sodium permanganate ("NaMnO$_4$"). The NaMnO$_4$ was provided in an aqueous solution that comprises 40% NaMnO$_4$ by weight. And the KMnO$_4$ was either provided in solid form as granular dry KMnO$_4$, or in an aqueous solution that comprises 15% KMnO$_4$ by weight. A predetermined amount of anhydrous calcium oxide ("CaO") also was added to the sample brines, except for Sample Brine No. 5 to which no CaO was added. Next, each of the sample brines was mixed under high shear for a mixing period of from about 2 hours to about 6 hours.

After the mixing period, there was a first static holding period of from about 48 to about 72 hours to allow for the appropriate oxidation reactions that form water insoluble compounds. The first static holding period should be of sufficient length to allow for the water insoluble compounds to separate from the sample brines into defined layers. For Sample Brine Nos. 5-7, a Cyanemer® flocculant was added to these brines after the first static holding period, and there was a second static holding period for a period of from about 24 hours to about 36 hours. After the first static holding period (or second static holding period where applicable), the sample brines and water insoluble compounds were mixed evenly to distribute the water insoluble compounds within the sample brines. Next, the water insoluble compounds were removed from the sample brine by filtration. Filtration of the sample brines was performed using a glass fiber 1.6-micron filter disc and varying amounts of DE filter media to a maximum of 27 psi delta pressure. After filtration, the final density (ppg), final iron content (mg/L), final pH, and volume recovery was determined for each of the sample brines using known techniques. The volume recovery was calculated using the following formula:

$$\% \text{ Volume Recovery} = \frac{\text{Volume of Sample Brine after Treatment}}{1 \text{ liter}} \times 100$$

where "1 liter" in the denominator refers to the volume of the initial sample brine.

The results are tabulated below in Table 1.

TABLE 1

| Brine | Initial Density (ppg) | Initial Iron Content (mg/L) | Flocculation | Final Density (ppg) | Volume Recovery (%) | Final Iron Content (mg/L) |
|---|---|---|---|---|---|---|
| Brine Sample No. 1 | 14.8 | 650 | No | 14.77 | 99.7 | 50 |
| Brine Sample No. 2 | 17.1 | 600 | No | 17.1 | 100 | <10 |
| Brine Sample No. 3 | 17.29 | 400 | No | 17.23 | 100 | 50 |
| Brine Sample No. 4 | 18.8 | 400 | No | 18.78 | 100 | 80 |
| Brine Sample No. 5 | 14.26 | 400 | Yes | 14.24 | 97.8 | 60 |

TABLE 1-continued

| Brine | Initial Density (ppg) | Initial Iron Content (mg/L) | Floccu-lation | Final Density (ppg) | Volume Recovery (%) | Final Iron Content (mg/L) |
|---|---|---|---|---|---|---|
| Brine Sample No. 6 | 14.2 | 1,000 | Yes | 14.18 | 94.4 | 70 |
| Brine Sample No. 7 | 14.3 | 600 | Yes | 14.2 | 96 | 70 |

Brine Sample No. 1 comprised calcium bromide, the sample having an initial density of 14.8 ppg, an initial iron content of 650 mg/L, and an initial pH of 5.9. Brine Sample No. 1 was treated with 400 mg of granular dry $KMnO_4$ and 100 mg of CaO. After treatment, Brine Sample No. 1 had a final density of 14.77 ppg, a final iron content of 50 mg/L, and a final pH of 5.9. Furthermore, 99.7% by volume of Brine Sample No. 1 was recovered.

Brine Sample No. 2 comprised zinc bromide, the sample having an initial density of 17.1 ppg, an initial iron content of 600 mg/L, and an initial pH of 3.8. Brine Sample No. 2 was treated with 450 mg of $KMnO_4$, and 100 mg of CaO. The $KMnO_4$ was provided in an aqueous solution that comprised 15% $KMnO_4$ by weight. After treatment, Brine Sample No. 2 had a final density of 17.1 ppg, a final iron content of less than 10 mg/L, and a final pH of 3.92. Furthermore, 100% by volume of Brine Sample No. 2 was recovered.

Brine Sample No. 3 comprised zinc bromide, the sample having an initial density of 17.29 ppg, an initial iron content of 400 mg/L, and an initial pH of 3.8. Brine Sample No. 3 was treated with 400 mg of $KMnO_4$ and 100 mg of CaO. The $KMnO_4$ was provided in an aqueous solution that comprised 15% $KMnO_4$ by weight. After treatment, Brine Sample No. 3 had a final density of 17.23 ppg, a final iron content of 50 mg/L, and a final pH of 3.7. Furthermore, 100% by volume of Brine Sample No. 3 was recovered.

Brine Sample No. 4 comprised zinc bromide, the sample having an initial density of 18.8 ppg, an initial iron content of 400 mg/L, and an initial pH of 2.7. Brine Sample No. 4 was treated with 300 mg of $KMnO_4$ and 100 mg of CaO. The $KMnO_4$ was provided in an aqueous solution that comprised 15% $KMnO_4$ by weight. After treatment, Brine Sample No. 4 had a final density of 18.78 ppg, a final iron content of 80 mg/L, and a final pH of 2.95. Furthermore, 100% by volume of Brine Sample No. 4 was recovered.

Brine Sample No. 5 comprised calcium bromide, the sample having an initial density of 14.26 ppg, an initial iron content of 400 mg/L, and an initial pH of 6.3. Brine Sample No. 5 was treated with 200 mg of granular dry $KMnO_4$. Additionally, after a static holding period, Fluid Sample No. 5 also was treated with Cyanemer® flocculant in an amount of 1.5% of flocculant by volume of the sample. After treatment, Brine Sample No. 5 had a final density of 14.24 ppg, a final iron content of 60 mg/L, and a final pH of 6.3. Furthermore, 97.8% by volume of Brine Sample No. 5 was recovered.

Brine Sample No. 6 comprised calcium bromide, the sample having an initial density of 14.2 ppg, an initial iron content of 1,000 mg/L, and an initial pH of 6.6. Brine Sample No. 6 was treated with 750 mg of granular dry $KMnO_4$ and 250 mg of CaO. Additionally, after the static holding period, Fluid Sample No. 6 also was treated with a Cyanemer® flocculant in an amount of 1.5% of flocculant by volume of the sample. After treatment, Brine Sample No. 6 had a final density of 14.18 ppg, a final iron content of 70 mg/L, and a final pH of 6.7. Furthermore, 94.4% by volume of Brine Sample No. 6 was recovered.

Brine Sample No. 7 comprised calcium bromide, the sample having an initial density of 14.3 ppg, an initial iron content of 600 mg/L, and an initial pH of 6. Brine Sample No. 7 was treated with 250 mg of $NaMnO_4$, and 150 mg of CaO. The $NaMnO_4$ was provided in an aqueous solution that comprised 40% $NaMnO_4$ by weight. Additionally, after a static holding period, Fluid Sample No. 7 also was treated with a Cyanemer® flocculant in an amount of 1.0% of flocculant by volume of the sample. After treatment, Brine Sample No. 7 had a final density of 14.2 ppg, a final iron content of 70 mg/L, and a final pH of 6.05. Furthermore, 96% by volume of Brine Sample No. 4 was recovered.

Therefore, these examples indicate that treating a brine using permanganate according to the methods of the present invention may provide desirable levels of contaminant reduction without substantial reductions in brine volume or density.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of treating a heavy halide brine comprising:
    providing a heavy halide brine having a density greater than about 12 pounds per gallon that comprises a heavy metal contaminant, wherein the heavy metal contaminant comprises water-soluble ions;
    adding a permanganate to the heavy halide brine to oxidize the water-soluble ions;
    allowing a water-insoluble compound to form; and
    removing the water insoluble compound from the heavy halide brine, wherein the removing of the water insoluble compound does not substantially negatively affect the density of the heavy halide brine.

2. The method of claim 1 wherein the heavy halide brine has a density in the range of from about 12 pounds per gallon to about 19 pounds per gallon.

3. The method of claim 1 wherein the heavy halide brine comprises a divalent salt.

4. The method of claim 1 wherein the permanganate comprises potassium permanganate.

5. The method of claim 1 wherein the permanganate comprises sodium permanganate.

6. The method of claim 1 wherein the permanganate is provided as a powder or as part of an aqueous fluid.

7. The method of claim 1 wherein the permanganate is added to the heavy halide brine in a heavy metal contaminant-to-permanganate weight ratio of from about 5:1 to about 1:1.

8. The method of claim 1 further comprising mixing the permanganate with the heavy halide brine after addition of the permanganate.

9. The method of claim 8 wherein mixing the permanganate with the heavy halide brine is performed until the heavy halide brine has a burnt orange to black purple tint.

10. The method of claim 8 wherein mixing the permanganate with the heavy halide brine is performed for a period of up to about 6 hours.

11. The method of claim 1 wherein allowing a water insoluble compound to form comprises a first static holding period.

12. The method of claim 11 wherein the first static holding period is in the range of from about 48 hours to about 96 hours.

13. The method of claim 11 wherein the water insoluble compound separates from the heavy halide brine during the first static holding period.

14. The method of claim 1 wherein the water insoluble compound is removed by filtration, centrifugation, or decantation.

15. The method of claim 1 wherein the water insoluble compound comprises an oxide, a hydrated oxide, or a hydroxide of the heavy metal contaminant.

16. The method of claim 1 further comprising adding a flocculant to the heavy halide brine.

17. The method of claim 16 wherein the flocculant is added to the heavy halide brine after the first static holding period.

18. The method of claim 17 further comprising allowing for a second static holding period of from about 12 hours to about 72 hours after addition of the flocculant.

19. The method of claim 1 further comprising adding a basic material to the heavy halide brine.

20. The method of claim 19 wherein the basic material comprises an anhydrous calcium hydroxide, sodium hydroxide, calcium hydroxide, calcium oxide, or magnesium oxide.

21. A method of removing heavy metal contaminants from a heavy halide brine that comprises:
  providing a heavy halide brine having a density greater than about 12 pounds per gallon comprising a heavy metal contaminant, wherein the heavy metal contaminant comprises water-soluble ions;
  combining a permanganate with the heavy halide brine to oxidize the water soluble ions;
  allowing a water insoluble compound to form; and
  removing the water insoluble compound from the heavy halide brine, wherein density of the heavy halide brine is not substantially altered.

22. The method of claim 21 wherein the heavy halide brine has a density in the range of from about 12 pounds per gallon to about 19 pounds per gallon.

23. The method of claim 21 wherein the heavy halide brine comprises a divalent salt.

24. The method of claim 21 wherein the permanganate comprises potassium permanganate.

25. The method of claim 21 wherein the permanganate comprises sodium permanganate.

26. The method of claim 21 wherein the permanganate is provided as a powder or as part of an aqueous fluid.

27. The method of claim 21 wherein the permanganate is added to the heavy halide brine in a heavy metal contaminant-to-permanganate weight ratio of from about 5:1 to about 1:1.

28. The method of claim 21 wherein combining the permanganate with the heavy halide brine comprises mixing the permanganate and the heavy halide brine.

29. The method of claim 28 wherein mixing the permanganate with the heavy halide brine is performed until the heavy halide brine has a burnt orange to black purple tint.

30. The method of claim 28 wherein mixing the permanganate with the heavy halide brine is performed for a period of up to about 6 hours.

31. The method of claim 21 wherein allowing a water insoluble compound to form comprises a first static holding period.

32. The method of claim 31 wherein the first static holding period is in the range of from about 48 hours to about 96 hours.

33. The method of claim 31 wherein the water insoluble compound separates from the heavy halide brine during the first static holding period.

34. The method of claim 21 wherein the water insoluble compound is removed by filtration, centrifugation, or decantation.

35. The method of claim 21 wherein the water insoluble compound comprises an oxide, a hydrated oxide, or a hydroxide of the heavy metal contaminant.

36. The method of claim 21 further comprising adding a flocculant to the heavy halide brine.

37. The method of claim 36 further comprising allowing for a second static holding period of from about 12 hours to about 72 hours after addition of the flocculant.

38. The method of claim 21 further comprising adding a basic material to the heavy halide brine.

39. The method of claim 38 wherein the basic material comprises an anhydrous calcium hydroxide, sodium hydroxide, calcium hydroxide, calcium hydroxide, or magnesium oxide.

40. A method of treating a heavy halide brine comprising:
  providing a heavy halide brine having a greater than about 12 pounds per gallon comprising a heavy metal contaminant, wherein the heavy metal contaminant comprises water-soluble ions;
  adding a permanganate to the heavy halide brine to oxidize the water-soluble ions;
  mixing the permanganate with the heavy halide brine for a period of up to about 6 hours
  allowing a water insoluble compound to form during a first static holding period, wherein the first static holding period is in the range of from about 48 hours to about 96 hours; and
  removing the water insoluble compound from the heavy halide brine, wherein density of the heavy halide brine is not substantially affected.

41. The method of claim 40 wherein the water insoluble compound separates from the heavy brine during the first static holding period.

* * * * *